United States Patent
Cho et al.

(10) Patent No.: US 7,411,660 B2
(45) Date of Patent: Aug. 12, 2008

(54) LASER STRAIGHT RULER AND METHOD FOR MEASURING DISTANCE AND PROJECTING LINE USING THE STRAIGHT RULER

(75) Inventors: Young-chul Cho, Suwon-si (KR); Seok-mo Chang, Incheon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/477,631

(22) Filed: Jun. 30, 2006

(65) Prior Publication Data
US 2007/0171393 A1    Jul. 26, 2007

(30) Foreign Application Priority Data
Jan. 20, 2006    (KR) .................. 10-2006-0006271

(51) Int. Cl.
    *G01C 3/08* (2006.01)
(52) U.S. Cl. ............... 356/3.01; 356/3.09; 356/139; 356/140
(58) Field of Classification Search ............ 356/4.01, 356/3.01, 3.09, 139, 140
    See application file for complete search history.

(56) References Cited

U.S. PATENT DOCUMENTS

| | | | | |
|---|---|---|---|---|
| 4,494,874 A | * | 1/1985 | DiMatteo et al. | 356/608 |
| 4,836,671 A | * | 6/1989 | Bautista | 356/3.1 |
| 5,231,401 A | * | 7/1993 | Kaman et al. | 342/55 |
| 5,568,255 A | * | 10/1996 | Johnson | 356/519 |
| 6,246,502 B1 | * | 6/2001 | Okada et al. | 359/196 |
| 6,483,106 B1 | * | 11/2002 | Ohtomo et al. | 250/236 |
| 6,870,611 B2 | * | 3/2005 | Savareigo et al. | 356/237.5 |
| 7,006,212 B2 | * | 2/2006 | Savareigo et al. | 356/237.1 |
| 2004/0083615 A1 | * | 5/2004 | Cotner | 33/288 |
| 2004/0213604 A1 | * | 10/2004 | Koide | 399/299 |
| 2004/0224796 A1 | * | 11/2004 | Kudla | 473/478 |
| 2005/0117153 A1 | * | 6/2005 | Kishi et al. | 356/399 |
| 2006/0017911 A1 | * | 1/2006 | Villar et al. | 356/4.01 |

* cited by examiner

*Primary Examiner*—Thomas H. Tarcza
*Assistant Examiner*—Timothy A Brainard
(74) *Attorney, Agent, or Firm*—Sughrue Mion, PLLC

(57) ABSTRACT

A laser straight ruler having a main body and a beam scanner installed on the main body. A laser beam is scanned to form a beam spot on an object. A position sensing device receives a laser beam reflected by the object and senses a position of the beam spot. A signal processing unit drives the beam scanner and processes a signal of the position sensing device. A display displays a change in a distance between the main body and the object and data including a measured distance value from the signal processing unit. An input portion inputs data including adjustment of a scanning width of the beam spot and sets start and end positions of the measured distance. A straight distance of the object is measured or the beam spot having a scanning width corresponding to a measured distance or a predetermined distance is projected to the object.

14 Claims, 9 Drawing Sheets

LASER STRAIGHT RULER AND METHOD FOR MEASURING DISTANCE AND PROJECTING LINE USING THE STRAIGHT RULER

CROSS-REFERENCE TO RELATED PATENT APPLICATIONS

This application claims priority from Korean Patent Application No. 10-2006-0006271, filed on Jan. 20, 2006, in the Korean Intellectual Property Office, the disclosure of which is incorporated herein in its entirety by reference.

BACKGROUND OF THE INVENTION

1. Field of the Invention

The present invention relates to an optical non-contact laser straight ruler and a method for measuring a distance and projecting a line using the laser straight ruler, and more particularly, to an optical non-contact laser straight ruler which can measure the distance of an object in three dimensions and reproduce the distance of the object, and a method for measuring a distance and projecting a line using the laser straight ruler.

2. Description of the Related Art

In general, a measuring tape or bar ruler which is used to measure a distance or draw a line in a contact manner is inconvenient to carry and difficult to measure the distance such as height or width of an object placed at a position that one cannot easily access. To address the problem, a straight ruler which can measure a distance optically in a non-contact manner is needed.

Figure 1:
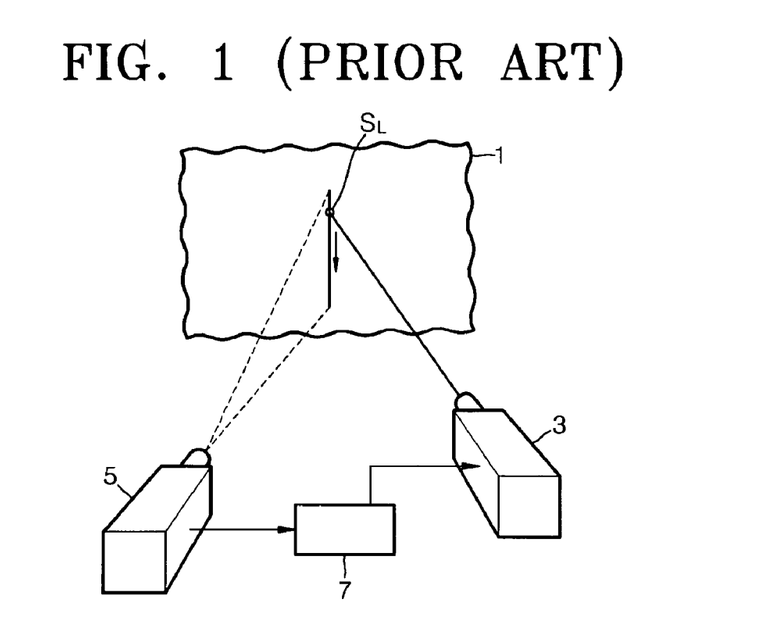
FIG. 1 is a view showing the conventional non-contact type measuring device.

FIG. 1 shows a conventional non-contact type measuring device which is disclosed in U.S. Pat. No. 4,494,874. Referring to FIG. 1, the conventional non-contact type measuring device measures an object in a triangulation method and includes a projector 3, a camera 5, and a control portion 7. The projector 3 projects a laser spot $S_L$ that is movable onto an object 1 to be measured. The camera 5 photographs the laser spot $S_L$ illuminated onto the object 1 to measure the light intensity and position of the laser spot $S_L$. The control portion 7 receives a signal proportional to the intensity of light received by the camera 5 and adjusts the amount of light projected by the projector 3.

Thus, the object 1 is scanned by flying the laser spot $S_L$ illuminated onto the object 1 so that three dimensional information of the object 1 can be obtained in a triangulation method from a signal measured in synchronization with the scanning. In the meantime, since the use of the conventional non-contact measuring device is restricted to the obtainment of the three dimensional information of the object 1, the application field of the device is limited.

SUMMARY OF THE INVENTION

To address the above and/or other problems, a non-limiting embodiment of the present invention provides a laser straight ruler which can measure the size of an object in three dimensions and simultaneously reproduce the measured distance of the object or project a predetermined distance to the object, and a method for measuring a distance and projecting a line using the laser straight ruler.

According to an aspect of the present invention, a laser straight ruler comprises a main body, a beam scanner installed on the main body and scanning a laser beam to form a beam spot having a predetermined scanning width on an object, a position sensing device receiving a laser beam reflected by the object and sensing a position of the beam spot formed on the object, a signal processing unit driving the beam scanner and processing a signal sensed by the position sensing device, a display displaying a change in a distance between the main body and the object and data including a measured distance value by receiving a signal from the signal processing unit, and an input portion to input data including adjustment of a scanning width of the beam spot and setting of start and end positions of the measured distance, in which a straight distance of the object is measured or the beam spot having a scanning width corresponding to a measured distance or a predetermined distance is projected to the object.

The laser straight ruler may further comprise a posture sensing device sensing a posture of the main body to identify a scanning direction of the beam spot projected to the object.

According to another aspect of the present invention, a method for measuring a distance using the above laser straight ruler includes scanning a laser beam onto an object to be measured, adjusting a scanning width of the laser beam scanned onto the object, and setting scanning start and end points, continuously scanning between the set scanning start and end points and obtaining position data through the position sensing device, and obtaining three-dimensional distance data by a triangulation method, in which information on a distance with respect to a width of the object from the three-dimensional distance data is obtained.

The method may further comprise determining whether right-angle scanning is performed with respect to the object, and adjusting roll and pitch of the scanned laser beam using the posture sensing device during the right-angle scanning.

The method may further comprise resetting a width of the object to be a desired width from the obtained three-dimensional distance data, and storing a reset width of the object.

According to another aspect of the present invention, a method for projecting a line using the above laser straight ruler includes scanning a laser beam onto an object to be projected and setting a scanning start point of the laser beam, and receiving information on a distance measured by the beam scanner, the position sensing device, and the signal processing unit or information on a distance input through the input portion and projecting the laser beam having a scanning width corresponding to the input distance onto the object, to form a line.

The method may further comprises determining whether right-angle scanning is performed with respect to the object, and adjusting roll and pitch of the scanned laser beam using the posture sensing device during the right-angle scanning.

The method may further comprise obtaining three-dimensional distance data corresponding to a scanning width of the laser beam projected to the object, calculating a rotation angle of the main body with respect to the object from the obtained three-dimensional distance data, and reforming a line by re-projecting a laser beam to the object considering the rotation angle.

BRIEF DESCRIPTION OF THE DRAWINGS

The above and other features and advantages of the present invention will become more apparent by describing in detail non-limiting embodiments thereof with reference to the attached drawings in which.

DETAILED DESCRIPTION OF THE INVENTION

Figure 2:
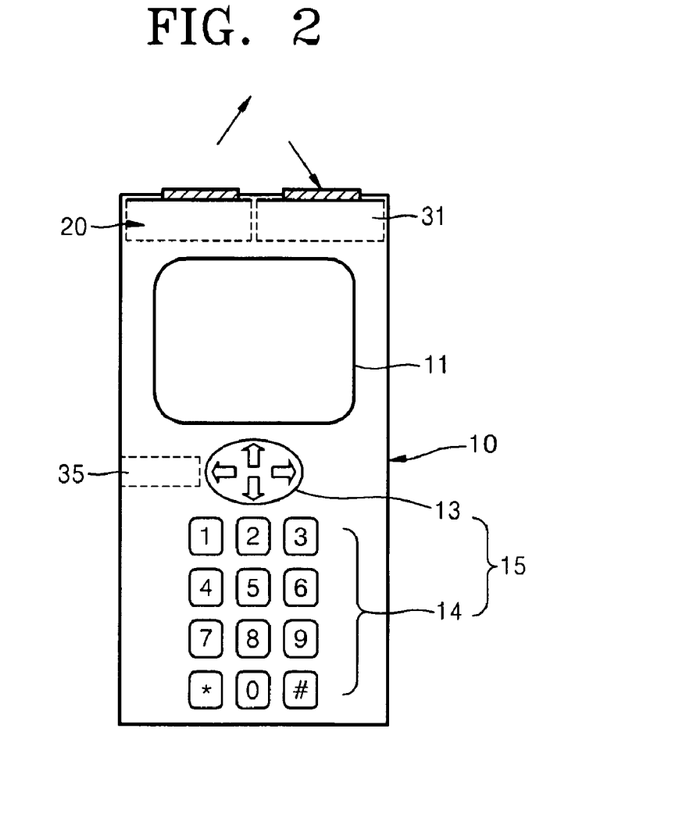
FIG. 2 is a plan view of a laser straight ruler according to a non-limiting embodiment of the present invention.
Figure 3:
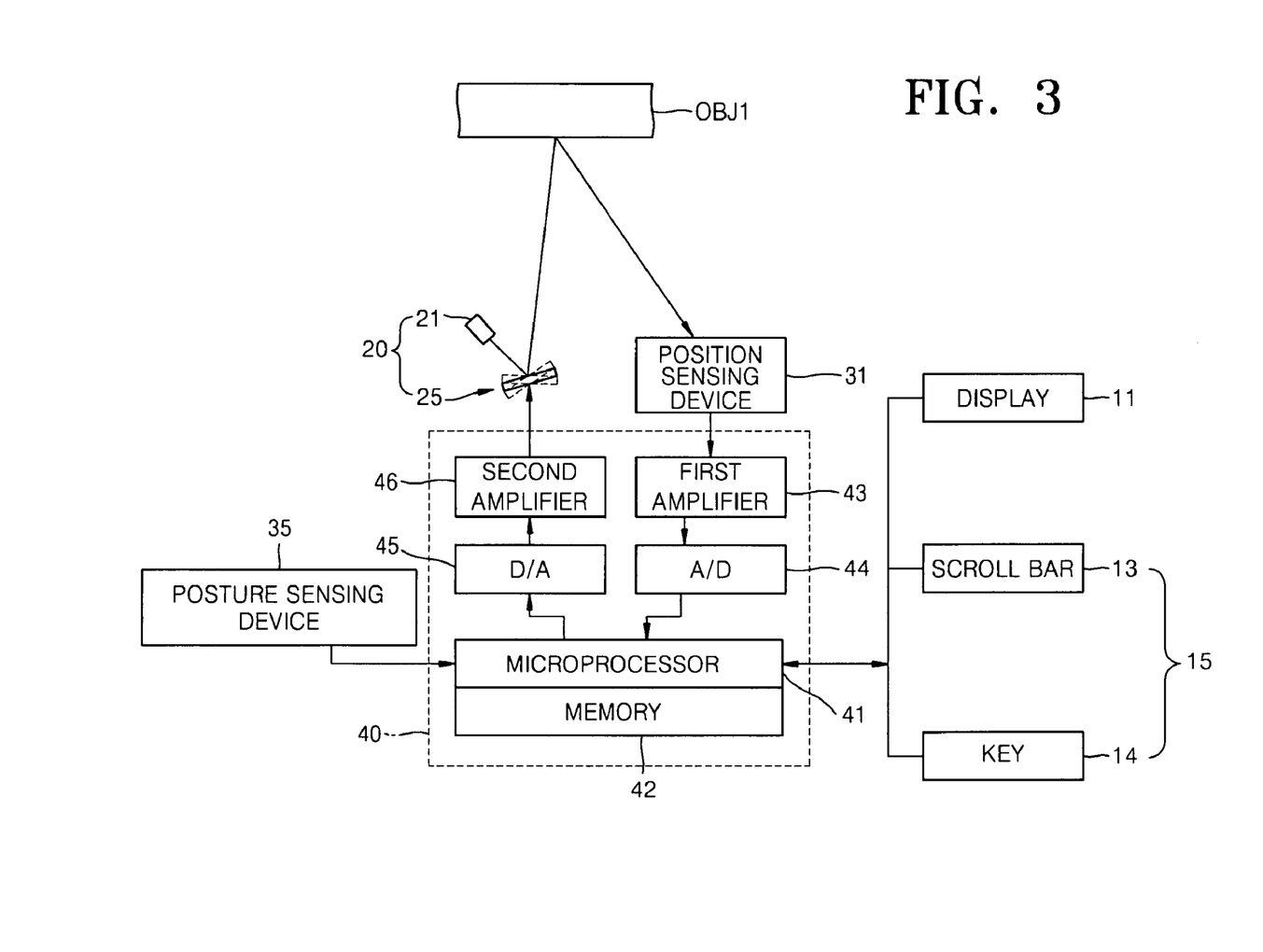
FIG. 3 is a circuit diagram of the laser straight ruler of FIG. 2.

Referring to FIGS. 2 and 3, a laser straight ruler according to a non-limiting embodiment of the present invention is used for measuring a straight distance of an object OBJ1 or projecting a beam spot having a scanning width corresponding to the measured distance or a predetermined distance onto the object OBJ1. The laser straight ruler includes a main body 10 that is portable, a beam scanner 20 installed in the main body 10, a position sensing device 31, a signal processing unit 40, a display 11, and an input portion 15.

The beam scanner 20 scans a laser beam spot to form a beam line having a predetermined scanning width on the object OBJ1. The beam scanning 20 includes a light source 21 such as a laser diode for emitting a laser beam and a scanning mirror 25 scanning the laser beam emitted from the light source 21. The scanning mirror 25 is driven in one dimension or two dimensions according to a drive voltage provided by the signal processing unit 40. The scanning mirror 25 may be an MEMS (MicroElectroMechanical system) scanner or galvanometer operated by means of piezoelectric driving, electrostatic driving, or electromagnetic driving.

Figure 4:
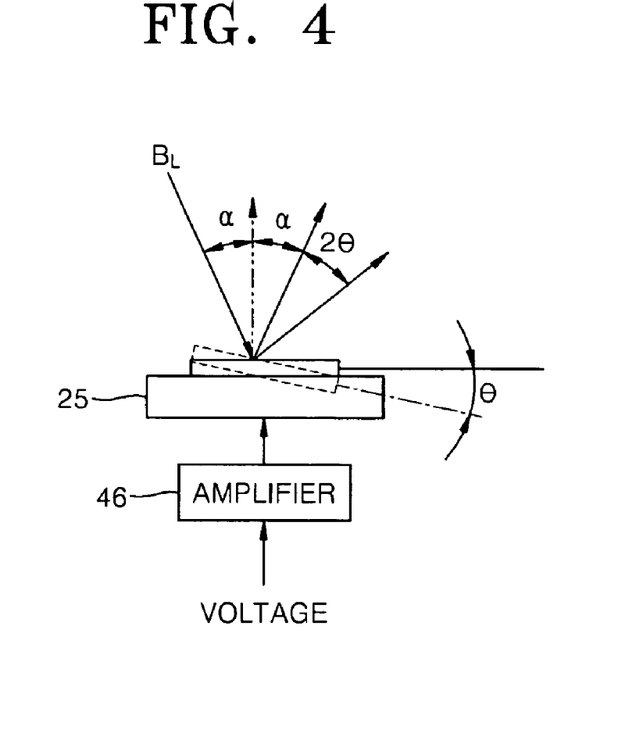
FIG. 4 is a view showing the change in a scanning direction according to the change in a rotation angle of a scanning mirror.

Referring to FIG. 4, the scanning mirror 25 is driven by a voltage drive signal amplified by a second amplifier 46 of the signal processing unit 40. When the scanning mirror 25 is inclined by an angle $\theta$, an incident light $B_L$ incident at an angle of $\alpha$ with respect to an optical axis is reflected by the scanning mirror 25 to form an angle of $\alpha+2\theta$ with respect to the optical axis.

Figure 5:
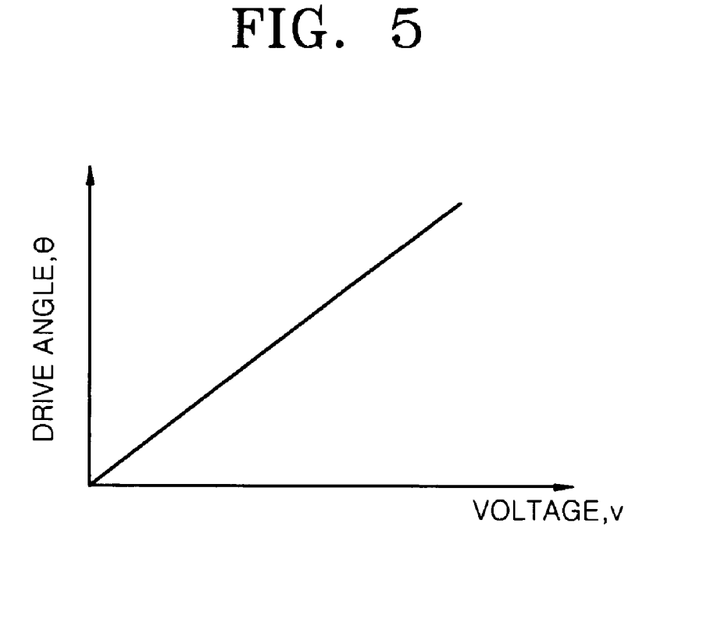
FIG. 5 is a graph showing the change in a drive angle of the scanning mirror according to an applied voltage.

The inclination drive angle $\theta$ of the scanning mirror 25 is proportional to an applied voltage in a predetermined section as shown in FIG. 5. Thus, since the drive angle $\Theta$ of the scanning mirror 25 can be controlled by adjusting the strength of the applied voltage, a laser beam line having a scanning width corresponding to the distance measured by a distance measuring method that is to be described later or a distance a user desires to project, with respect to the object OBJ1, can be projected.

The position sensing device 31, for example, a one-dimensional sensor, receives a laser beam emitted from the beam scanner 20, and reflected from the object OBJ1, and senses a change in the position of a beam spot formed on the object OBJ1. The signal processing unit 40 drives the beam scanner 20, processes a signal sensed by the position sensing device 31 and information input through the input portion 15, and provides display information to the display 11. The signal processing portion 40 includes a microprocessor 41 and a memory 42. The memory 42 stores the three-dimensional distance data obtained from drive data of the beam scanner 20, data input through the position sensing device 31 and the input portion 15.

The signal processing unit 40 includes a first amplifier 43 amplifying an electric signal that is optoelectrically converted from light received by the position sensing device 31, an A/D converter 44 converting an amplified analog signal to a digital signal, a D/A converter 45 converting a digital signal for driving the beam scanner 20 provided by the microprocessor 41 to an analog signal, and the second amplifier 46 amplifying the converted signal for driving the beam scanner 20 and providing the amplified signal to the beam scanner 20.

The display 11 receives a signal from the signal processing unit 40 and indicates data such as a change in the distance between the main body 10 and the object OBJ1 and the measured distance value. The input portion 15 performs input of data for the adjustment of the distance of the beam line formed on the object OBJ1, the adjustment of the position of the beam spot, and the setting of a start position and an end position of the measured distance. The input portion 15 includes a scroll bar 13 selecting a predetermined point while moving a cursor all directions on the display 11 and a keyboard 14 having a plurality of numeric keys.

The laser straight ruler further includes a posture sensing device 35 which senses the posture of the main body 10 to determine whether the main body 10 is inclined with respect to the direction of gravity. Thus, a laser beam can be projected in a direction, for example, in a horizontal or vertical direction, to project a scan line to the object OBJ1. The posture sensing device 35 includes, for example, a two-dimensional tilt sensor or three-axis acceleration sensor (not shown).

Figure 6:
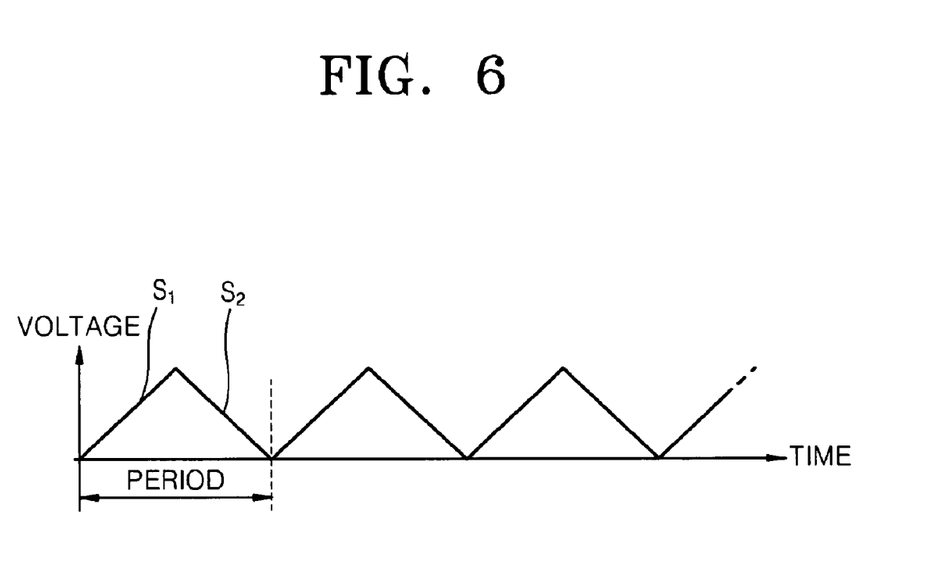
FIG. 6 is a graph showing the change in a drive voltage of a scanner according to time during line scanning.

The signal processing unit 40, as shown in FIG. 6, drives the beam scanner 20 by a triangular wave voltage so that the laser beam scanned by the beam scanner 20 forms a continuous scan line. FIG. 6 shows the change in a voltage according to time. In the change in a voltage curve for one period, a voltage increases linearly as indicated by S1 during the first half of the period while the voltage decreases linearly as indicated by S2 during the latter half of the period. Thus, by repeating the above voltage application operation for each period, the laser beam can form a continuous scan line.

Figure 7:
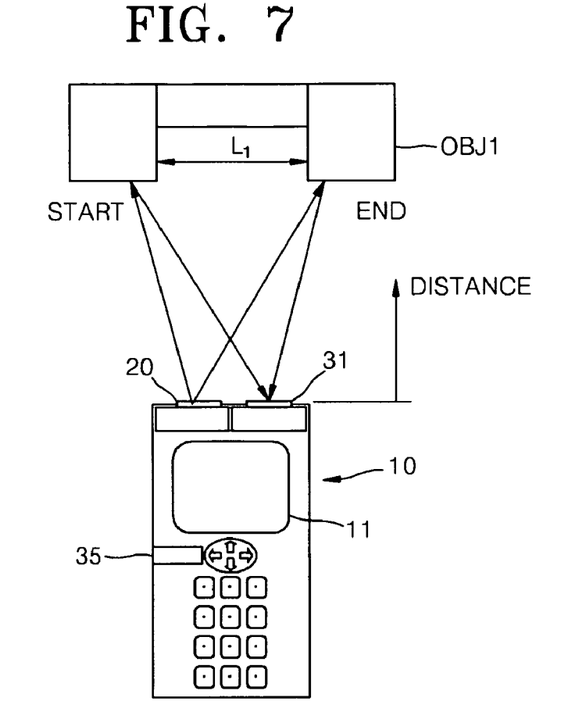
FIG. 7 is a view showing a scan mode of the laser straight ruler of FIG. 2.
Figure 8A:
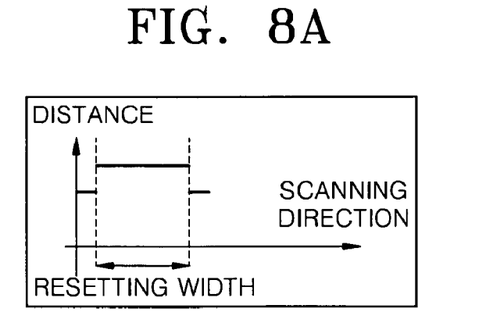
FIG. 8A is a graph showing the change in a distance between a main body and an object in a scanning direction indicated on a display.
Figure 8B:
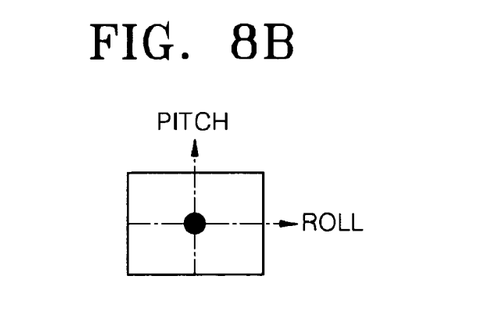
FIG. 8B is a view showing information on the posture of the main body indicted on the display in the scan mode.
Figure 9:
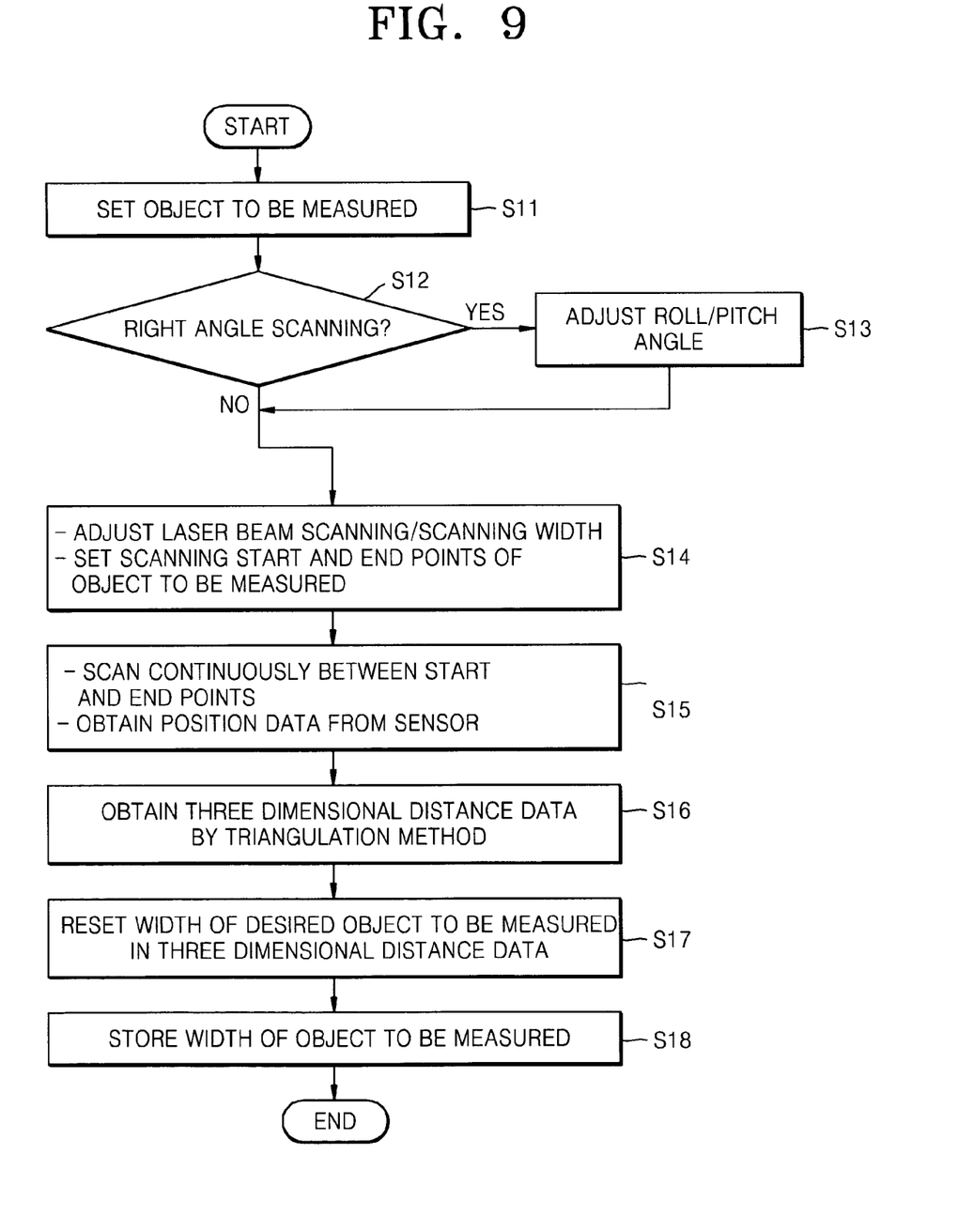
FIG. 9 is a flowchart showing the order of measurement of a distance using the laser straight ruler of FIG. 2.

A method for measuring a distance using a laser straight ruler according to the present invention configured as above is described in detail. FIG. 7 is a view showing a scan mode to measure a predetermined width $L_1$ of the object OBJ1 using the laser straight ruler of FIG. 2. FIGS. 8A and 8B are a graph showing the change in a distance between the main body 10 and the object OBJ1 in a scanning direction indicated on the display 11 and a view showing information on the posture of the main body 10, respectively. FIG. 9 is a flowchart for explaining the order of measurement of a distance using the laser straight ruler of FIG. 2.

Referring to FIGS. 7, 8A, 8B, and 9, the object OBJ1 of FIG. 7 to be measured is set (S11). The beam scanner 20 scans a laser beam onto the object OBJ1 and a scanning start point and a scanning end point are set by adjusting the scanning width of the laser beam scanned onto the object OBJ1 (S14).

The laser beam is continuously scanned between the set scanning start point and end point to obtain position data between the two points through the position sensing device 31 (S15).

The signal processing unit 40 receives the position data obtained by the position sensing device 31 and obtains three dimensional distance data by a triangulation method (S16). Thus, information on a distance with respect to the width of the object OBJ1 to be measured can be obtained. Since the method of obtaining data of the three dimensional distance by the triangulation method is well known, a detailed description thereof is omitted herein.

It is preferable to further include, between S11 and S14, the operations of determining whether right-angle scanning is performed with respect to the object OBJ1 (S12) and adjusting roll and pitch of the scanned laser beam when the right-angle scanning is desired (S13). The right-angle scanning represents the scanning of a laser beam in a direction perpendicular or parallel to the gravity direction. The adjusting of the roll and pitch is performed by measuring the roll and pitch using the posture sensing device 35 and showing angle information of the posture of the main body 10 indicated on the display.

To reproduce the width of an object measured through a projection mode that is described later, it is preferable to further include the operations of resetting the width of a desired object to be measured in the obtained three dimensional distance data (S17) and storing the reset width of the object to be measured in the memory 42 of FIG. 3 (S18).

Figure 10:
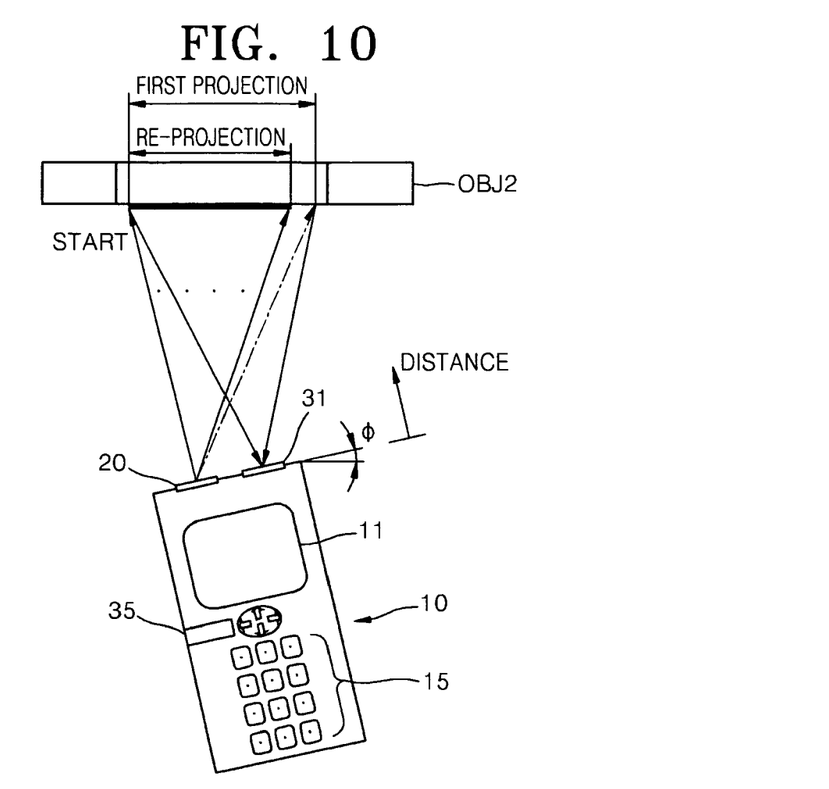
FIG. 10 is a view showing a projection mode of the laser straight ruler of FIG. 2.
Figure 11A:
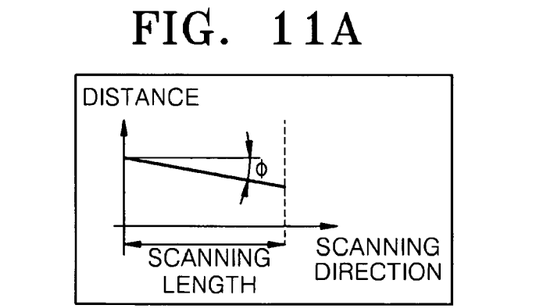
FIG. 11A is a graph showing the distance between the main body and the object in the scanning direction indicated on the display.
Figure 11B:
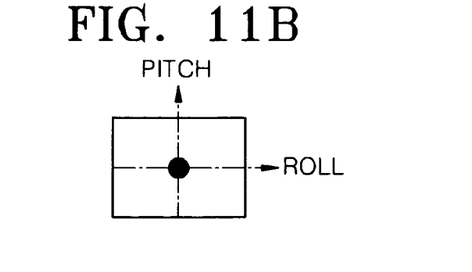
FIG. 11B is a view showing information on the posture of the main body indicted on the display in the projection mode.
Figure 12:
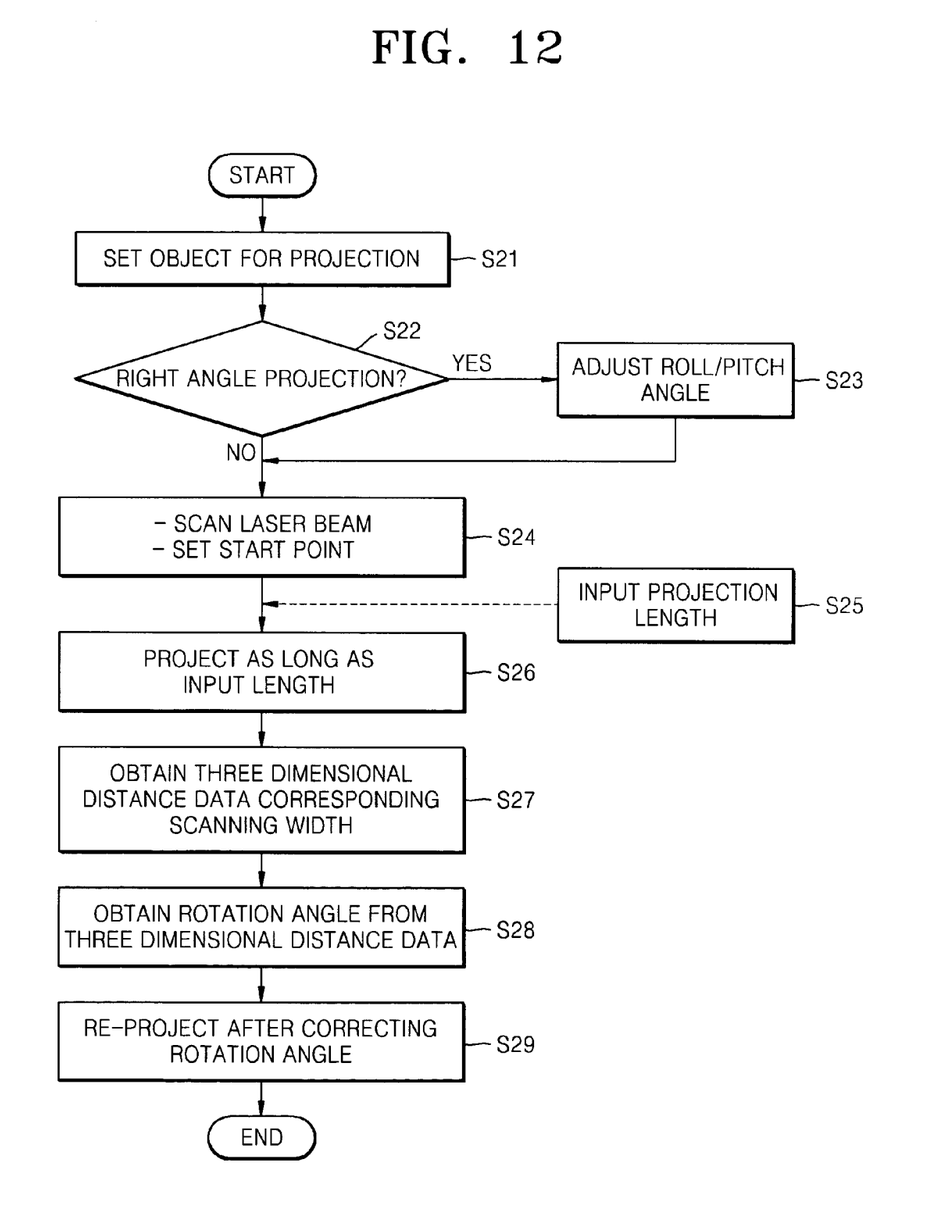
FIG. 12 is a flowchart showing the order of projection using the laser straight ruler of FIG. 2.

A method for projecting a scan line according to the present invention configured as above is described in detail. FIG. 10 is a view showing a projection mode in which the laser straight ruler of FIG. 2 scans a laser beam having a predetermined scanning width toward an object OBJ2. FIGS. 11A and 11B are a graph showing the change in a distance between the main body 10 and the object OBJ2 in a scanning direction indicated on the display 11 and a view showing information on the posture of the main body 10, respectively. FIG. 12 is a flowchart showing the order of projection using the laser straight ruler of FIG. 2.

Referring to FIGS. 10, 11A, 11B, and 12, the object OBJ2 of FIG. 10 to be measured is set (S21). The beam scanner 20 scans a laser beam onto the object OBJ2 and a scanning start point of the laser beam is set (S24). The information on distance corresponding to the distance of projection is input (S25) and a laser beam having a scanning width corresponding to the input information is projected from the set scanning start point to form a line (S26). The input distance information is the distance information measured through the beam scanner 20, the position sensing device 31, and the signal processing unit 40 of FIG. 3 or the distance information input through the input portion 15.

Also, it is preferable to further include, between S21 and S24, the operations of determining whether right-angle scanning is performed with respect to the object OBJ2 (S22) and adjusting roll and pitch of the scanned laser beam when the right-angle scanning is desired (S23). The adjusting of the roll and pitch in the operation S23 is performed by measuring the roll and pitch using the posture sensing device 35 and showing angle information of the posture of the main body 10 indicated on the display 11.

The present invention may further comprise the operations of obtaining three dimensional distance data corresponding to the scanning width of the laser beam projected onto the object OBJ2 (S27), calculating a rotation angle Φ of the main body 10 with respect to the object OBJ2 (S28), and reforming a scanning line by correcting the rotation angle Φ and re-projecting a laser beam onto the object OBJ2 (S29).

In detail, as shown in FIG. 10, when the main body 10 is inclined by the rotation angle Φ with respect to the object OBJ2 based on the data sensed by the posture sensing device 35, the distance changes according to the scanning direction as shown in FIG. 11A. The change in the rotation angle Φ of the object OBJ2 can be calculated from the distance data measured through the triangulation method. A desired distance can be projected onto the object OBJ2 by controlling the drive angle of the beam scanner 20 based on the calculated rotation angle Φ.

Figure 13:
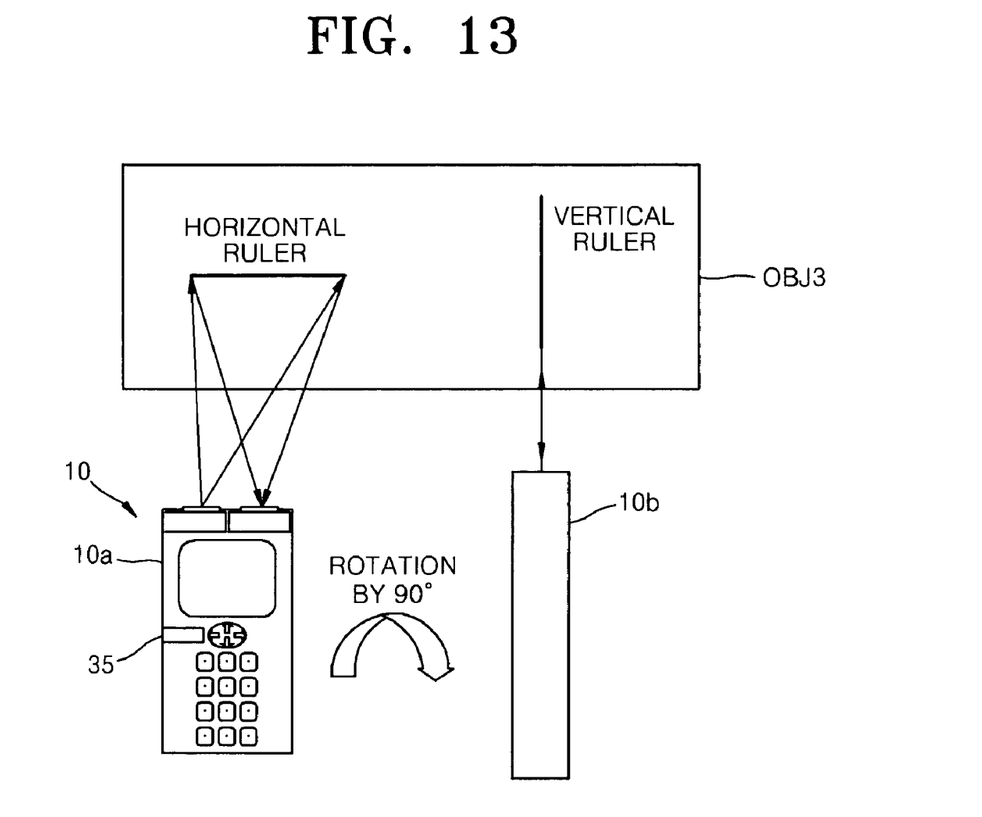
FIG. 13 is a view for explaining a line projection method using two laser straight rulers.

According to the line projection method using the laser straight ruler 10 according to the present non-limiting embodiment, as shown in FIG. 13, at least two laser straight rulers are provided and at least two lines can be simultaneously projected using the laser straight rulers onto an object OBJ3 for projection. FIG. 13 is a view for explaining a line projection method using two laser straight rulers 10a and 10b as the laser straight ruler 10.

Referring to FIG. 13, a first laser straight ruler 10a as a horizontal ruler forms a line perpendicular to the gravity direction on the object OBJ3 while a second laser straight ruler 10b as a vertical ruler forms a line parallel to the gravity direction. When the arrangement and position of the first and second laser straight rulers 10a and 10b are compared with each other, the second laser straight ruler 10b is rotated by 90° to the right with respect to the first laser straight ruler 10a. Whether the vertical line and horizontal line are correctly formed can be seen from the inclination information of the main body sensed by the posture sensing device 35 as described above.

As described above, the beam scanner 20 of each of the first and second laser straight rulers 10a and 10b scans a laser beam so that both horizontal and vertical lines can be simultaneously projected onto the object OBJ3. Although in FIG. 13 both horizontal and vertical lines scanned by the respective first and second laser straight rulers 10a and 10b are projected as being separated from each other, the present invention is not limited thereto so that the horizontal and vertical lines can be scanned so as to cross each other.

Thus, the laser straight ruler according to the present invention configured as above and a method for measuring a distance and projecting a line using the laser straight ruler can accurately measure a distance between positions in a non-contact manner using a laser beam, while not being affected by the distance and an angle between the main body and the object. Also, according to the present invention, the measured distance can be accurately reproduced onto the object for projection or a distance that is already known can be accurately projected onto the object to be projected.

Also, the laser straight ruler according to the present invention can be embodied into personal mobile devices such as mobile phones or PDAs (personal digital assistants). That is, the laser straight ruler can be embodied into the personal mobile device by adding a beam scanner, a position sensing device, and a tilt sensing device, while using a display and a microprocessor in common.

While this invention has been particularly shown and described with reference to non-limiting embodiments thereof, it will be understood by those skilled in the art that various changes in form and details may be made therein without departing from the spirit and scope of the invention as defined by the appended claims.

What is claimed is:

1. A laser straight ruler comprising:
   a beam scanner operative to scan a beam that forms a beam spot on an object;

a position sensing device operative to receive a beam reflected by the object and operative to sense a position of the beam spot formed on the object;

a signal processing unit operative to drive the beam scanner and operative to process a signal sensed by the position sensing device to determine a change in a distance between the beam scanner and the object and to obtain a measured distance;

a display that displays a change in a distance between the beam scanner and the object and data including the measured distance value by receiving a signal from the signal processing unit;

an input portion that inputs data including adjustment of a scanning width of the beam spot and setting of start and end positions of the measured distance;

wherein the beam scanner, the position sensing device, the signal processing unit, the display, and the input portion are provided together on a single portable main body.

2. The laser straight ruler of claim 1, wherein the beam scanner comprises:

a light source emitting the beam; and a scanning mirror scanning the beam emitted from the light source.

3. The laser straight ruler of claim 1, further comprising a posture sensing device sensing a posture of the beam scanner to identify a scanning direction of the beam spot projected to the object;

wherein the display displays angle information of the sensed posture.

4. The laser straight ruler of claim 3, wherein the posture sensing device is formed of a two-dimensional tilt sensor or a three-axis acceleration sensor.

5. The laser straight ruler of claim 1, wherein the signal processing unit is operative to drive the beam scanner by a triangular wave voltage so that the beam scanned by the beam scanner forms a continuous scanning line.

6. The laser straight ruler of claim 1, wherein the beam is a laser beam.

7. A method for measuring a distance using a laser straight ruler, the method comprising:

scanning a beam using a beam scanner onto an object to be measured;

adjusting a scanning width of the beam scanned onto the object;

setting scanning start and end points;

continuously scanning between the set scanning start and end point;

obtaining position data;

sensing a posture of the beam scanner;

displaying angle information of a sensed posture of the beam scanner;

adjusting roll and pitch of the scanned beam to adjust scanning direction; and obtaining three-dimensional distance data by a triangulation method, wherein information on a distance with respect to a width of the object is obtained from the three-dimensional distance data.

8. The method of claim 7, further comprising:

resetting a width of the object to a desired width from the obtained three-dimensional distance data; and storing a reset width of the object.

9. The method of claim 7, wherein the beam is a laser beam.

10. A method for projecting a line using a laser straight ruler, the method comprising:

scanning a beam using a beam scanner onto an object;

setting a scanning start point of the beam; and receiving either information on a distance measured, where the distance measured is a distance of projection of the laser beam onto the object from the scanning staff point or information on a distance input through an input portion, sensing a posture of the beam scanner;

displaying angle information of a sensed posture of the beam scanner;

adjusting roll and pitch of the scanned beam to adjust scanning direction; and projecting the beam onto the object to form a line, the laser beam having a scanning width corresponding to either the measured distance or the input distance.

11. The method of claim 10, further comprising:

obtaining three-dimensional distance data corresponding to a scanning width of the beam projected to the object;

calculating a rotation angle of the main body with respect to the object from the obtained three-dimensional distance data; and reforming a line by re-projecting a beam to the object based on the rotation angle.

12. The method of claim 10, wherein at least two laser straight rulers are provided and at least two lines are projected to the object.

13. The method of claim 12, wherein the laser straight ruler comprises a first laser straight ruler forming a line perpendicular to a gravity direction and a second laser straight ruler forming a line horizontal to the gravity direction, and a beam scanner of each of the first and second laser straight rulers scans the beam to project a horizontal line and a vertical line to the object.

14. The method of claim 10, wherein the beam is a laser beam.

* * * * *